US008665464B2

(12) United States Patent
Sato

(10) Patent No.: US 8,665,464 B2
(45) Date of Patent: Mar. 4, 2014

(54) INFORMATION PROCESSING SYSTEM, IMAGE FORMING APPARATUS, MANAGEMENT APPARATUS, MANAGEMENT METHOD, AND COMPUTER PROGRAM FOR SEARCHING AN ADDRESS INFORMATION OF MANAGEMENT IN A CASE WHEN AN ERROR NOTIFICATION IS RECEIVED

(75) Inventor: Tomoya Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 13/538,967

(22) Filed: Jun. 29, 2012

(65) Prior Publication Data
US 2013/0010322 A1 Jan. 10, 2013

(30) Foreign Application Priority Data
Jul. 8, 2011 (JP) .................................. 2011-152180

(51) Int. Cl.
*G06K 15/02* (2006.01)
(52) U.S. Cl.
USPC .......... 358/1.14; 358/1.15; 709/217; 709/218
(58) Field of Classification Search
USPC .......................... 358/1.14, 1.15; 709/217, 218
See application file for complete search history.

(56) References Cited

U.S. PATENT DOCUMENTS

| 2006/0015573 A1* | 1/2006 | Hurst-Hiller et al. .......... 709/218 |
| 2006/0077425 A1* | 4/2006 | Nakata et al. ................. 358/1.15 |
| 2010/0014114 A1* | 1/2010 | Oosawa ........................ 358/1.15 |
| 2011/0185039 A1* | 7/2011 | Ueno et al. .................... 709/217 |

FOREIGN PATENT DOCUMENTS

JP 2007-130838 A 5/2007

* cited by examiner

*Primary Examiner* — Qian Yang
(74) *Attorney, Agent, or Firm* — Canon U.S.A., Inc. IP Division

(57) ABSTRACT

If a change is made in configuration information, an image forming apparatus transmits a configuration data generation request, including the configuration information which has been changed, to a setting value management service. If the image forming apparatus receives an error notification indicating the failure of the configuration data generation request from the setting value management service, the image forming apparatus multicasts a search packet on a network and searches an image forming apparatus storing address information of the setting value management service. Based on a response from the searched image forming apparatus, the image forming apparatus transmits a configuration data generation request to the setting value management service that manages the image forming apparatus.

10 Claims, 12 Drawing Sheets

FIG.4A

| SETTING VALUE IDENTIFIER | VALUE |
|---|---|
| copy_settings.nup | 2-UP |
| device_settings.cloud_address | http://ddd.com/config |
| device_settings.sleep_time | 10 MINUTES |
| fax_settings.received_print | OFF |
| box_settings.server_address | "http://192.168.1.1/server/" |

FIG.4B

| SETTING VALUE IDENTIFIER | VALUE |
|---|---|
| copy_settings.nup | 2-UP |
| device_settings.cloud_address | http://ddd.com/config |
| device_settings.sleep_time | 10 MINUTES |
| fax_settings.received_print | ON |
| box_settings.server_address | "http://192.168.1.1/server/" |

FIG.4C

| SETTING VALUE IDENTIFIER | VALUE |
|---|---|
| copy_settings.nup | 2-UP |
| device_settings.cloud_address | http://ddd.com/config |
| device_settings.sleep_time | 10 SECONDS |
| fax_settings.received_print | ON |

FIG.6

| DEVICE IDENTIFIER | TENANT IDENTIFIER | VIRTUAL DEVICE CONFIGURATION DATA | VIRTUAL CONFIGURATION DATA | NOTIFICATION FLAG |
|---|---|---|---|---|
| 010001 | 100 | 1 | 1 | UNNOTIFIED |
| 010002 | 100 | 2 | 2 | UNNOTIFIED |
| 020001 | 100 | 3 | 3 | NOTIFIED |
| 010010 | 200 | 4 | 4 | NOTIFIED |

FIG.7A

| SETTING VALUE IDENTIFIER | DEFAULT VALUE | VALUE RANGE | CONDITION |
|---|---|---|---|
| copy_settings.nup | 1-UP | 1-UP, 2-UP, 4-UP | NONE |
| device_settings.cloud_address | http://ddd.com/config | 256 BYTES | NONE |
| device_settings.sleep_time | 10 MINUTES | 1MINUTE, 10 MINUTES, 1 HOUR | NONE |
| fax_settings.received_print | OFF | ON, OFF | FAX UNIT |
| box_settings.server_address | "" | 256 BYTES | NONE |

FIG.7B

| SETTING VALUE IDENTIFIER | DEFAULT VALUE | VALUE RANGE | CONDITION |
|---|---|---|---|
| copy_settings.nup | 1-UP | 1-UP, 2-UP, 4-UP | NONE |
| device_settings.cloud_address | http://ddd.com/config | 256 BYTES | NONE |
| device_settings.sleep_time | 10 SECONDS | 10 SECONDS, 1MINUTE, 10 MINUTES, 1 HOUR | NONE |
| fax_settings.received_print | OFF | ON, OFF | FAX UNIT |

| SETTING VALUE IDENTIFIER | VALUE |
|---|---|
| copy_settings.nup | 2-UP |
| device_settings.cloud_address | http://ddd.com/config |
| device_settings.sleep_time | 10 SECONDS |
| fax_settings.received_print | ON |
| box_settings.server_address | "http://192.168.1.1/server/" |

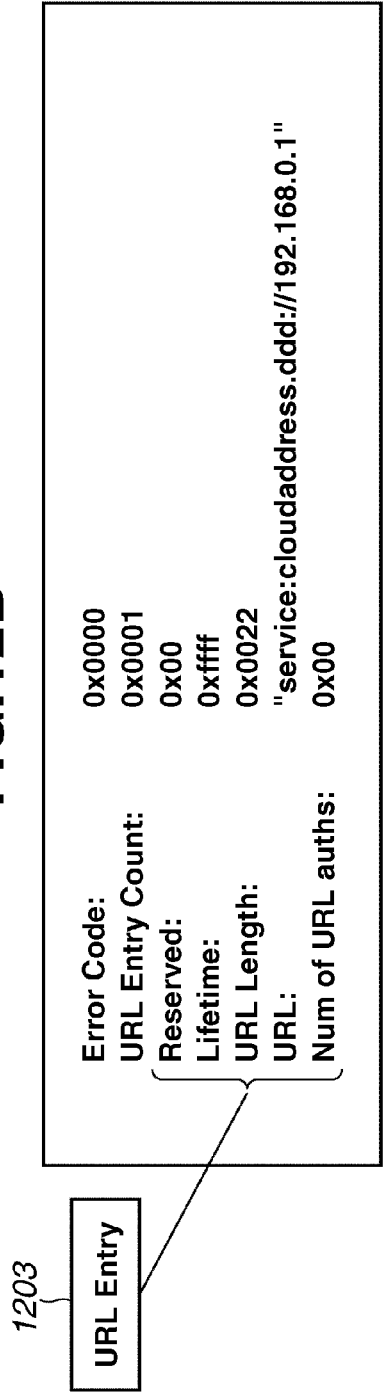

FIG.12A

| | |
|---|---|
| length of <PRList>: | 0x0000 |
| <PRList> String: | NULL |
| length of <service-type>: | 0x0014 |
| <service-type> String: | "service:cloudaddress.ddd" ~1201 |
| length of <scope-list>: | 0x0005 |
| <scope-list> String: | "ddd" ~1202 |
| length of predicate string: | 0x0000 |
| Service Request <predicate>: | NULL |
| length of <SLP SPI> string: | 0x0000 |
| <SLP SPI> String: | NULL |

FIG.12B

| | |
|---|---|
| Error Code: | 0x0000 |
| URL Entry Count: | 0x0001 |
| Reserved: | 0x00 |
| Lifetime: | 0xffff |
| URL Length: | 0x0022 |
| URL: | "service:cloudaddress.ddd://192.168.0.1" |
| Num of URL auths: | 0x00 |

1203 URL Entry

INFORMATION PROCESSING SYSTEM, IMAGE FORMING APPARATUS, MANAGEMENT APPARATUS, MANAGEMENT METHOD, AND COMPUTER PROGRAM FOR SEARCHING AN ADDRESS INFORMATION OF MANAGEMENT IN A CASE WHEN AN ERROR NOTIFICATION IS RECEIVED

BACKGROUND OF THE INVENTION

1. Field of the Invention

The present invention relates to an information processing system, an image forming apparatus, a management apparatus, a management method, and a computer program.

2. Description of the Related Art

There has been proposed an image forming apparatus configured to store configuration data in a storage unit. The configuration data is setting information (operation setting information). The operation of the image forming apparatus is changed according to the configuration data. Since the configuration data is stored in a storage unit of each image forming apparatus, if there are many image forming apparatuses, the setting of the configuration data needs to be changed a number of times equal to the number of the image forming apparatuses. In order to eliminate the need for repeating such operations, there has been proposed a technique that allows collective setting of the configuration data of a plurality of image forming apparatuses by an instruction issued from an information processing apparatus.

For example, Japanese Laid-Open Patent Application No. 2007-130838 discusses an image forming system that employs a technique that can reflect system initial setting information, downloaded from a server, to a plurality of information apparatuses, when the initial setting operation is performed.

However, according to the image forming system discussed in Japanese Laid-Open Patent Application No. 2007-130838, configuration data that is changed according to the model or the hardware option of the image forming apparatuses cannot be reflected to the image forming apparatus.

Considering a cloud service where configuration data of a plurality of image forming apparatuses are managed by a server on the Internet, an image forming apparatus that receives the service acquires the configuration data managed by the cloud service and operates based on the acquired configuration data. Before such an image forming apparatus is shipped, the location of the cloud service can be stored in the image forming apparatus. It is convenient for the user to use such an image forming apparatus since the apparatus can automatically access the cloud service, acquire the configuration data, and operate, by the user simply connecting the apparatus to the network. This can relieve the user of the setting operation at the initial installation of the image forming apparatus.

However, if the user of the image forming apparatus desires to use a service different from the cloud service, such as a service that manages configuration data (configuration data management service), the address of the configuration data management service needs to be set in the image forming apparatus.

For example, many users may desire to use the configuration data service provided in a user-dedicated environment instead of the configuration data service provided in a public cloud service, due to security reasons. Generally, such a user-dedicated environment is called a private cloud. If the configuration data is to be managed by the private cloud, the image forming apparatus needs to be connected to the private cloud in the user environment rather than to the location of the cloud service which is stored before it is shipped. Thus, the image forming apparatus displays a user interface (UI) which can be used for setting the location of the private cloud. When the user performs the initial installation of the image forming apparatus, the user makes the setting using the UI.

However, generally, the user of a private cloud is a large-scale user and uses a large number of image forming apparatuses. Thus, it is inconvenient for the user to make settings of the location (address) of the private cloud for the large number of image forming apparatuses.

SUMMARY OF THE INVENTION

The present invention is directed to an information processing system which includes an image forming apparatus which can automatically acquire an address of a management apparatus that manages the operation setting information of the image forming apparatus such that the user can acquire the operation setting information from the management apparatus without setting the address of the management apparatus.

According to an aspect of the present invention, an information processing system includes a management apparatus configured to manage operation setting information used for changing an operation of an image forming apparatus and the image forming apparatus configured to be managed, in a predetermined management unit, by the management apparatus. The image forming apparatus includes a configuration change determination unit configured to determine whether a change in configuration information of a device in the image forming apparatus is made, a request unit configured to transmit, if a change in the configuration information is determined, an operation setting generation request including the changed configuration information and information about the management unit corresponding to the image forming apparatus, and requesting generation of operation setting information corresponding to the image forming apparatus, to the management apparatus via a network, an acquisition unit configured to acquire the operation setting information corresponding to the image forming apparatus from the management apparatus, which is a destination of the operation setting generation request and which has generated the operation setting information according to a determination that the operation setting generation request has been successful, an error notification reception unit configured to receive an error notification from the management apparatus, which is the destination of the operation setting generation request and which has determined that the operation setting generation request has failed, and a search unit configured to, if the error notification reception unit receives the error notification from the management apparatus, search an image forming apparatus that stores address information of the management apparatus, and to acquire the address information of the management apparatus that manages the image forming apparatus from the searched image forming apparatus, wherein, if the error notification reception unit receives the error notification from the management apparatus, the request unit transmits the operation setting generation request to the management apparatus that corresponds to the address information acquired by the search unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A, 4B, and 4C illustrate examples of real configuration data.

FIG. 6 illustrates an example of a virtual device.

FIGS. 7A and 7B illustrates an example of a model-based setting value schema.

FIGS. 12A and 12B illustrate examples of a search packet and a response packet.

DESCRIPTION OF THE EMBODIMENTS

Figure 1:
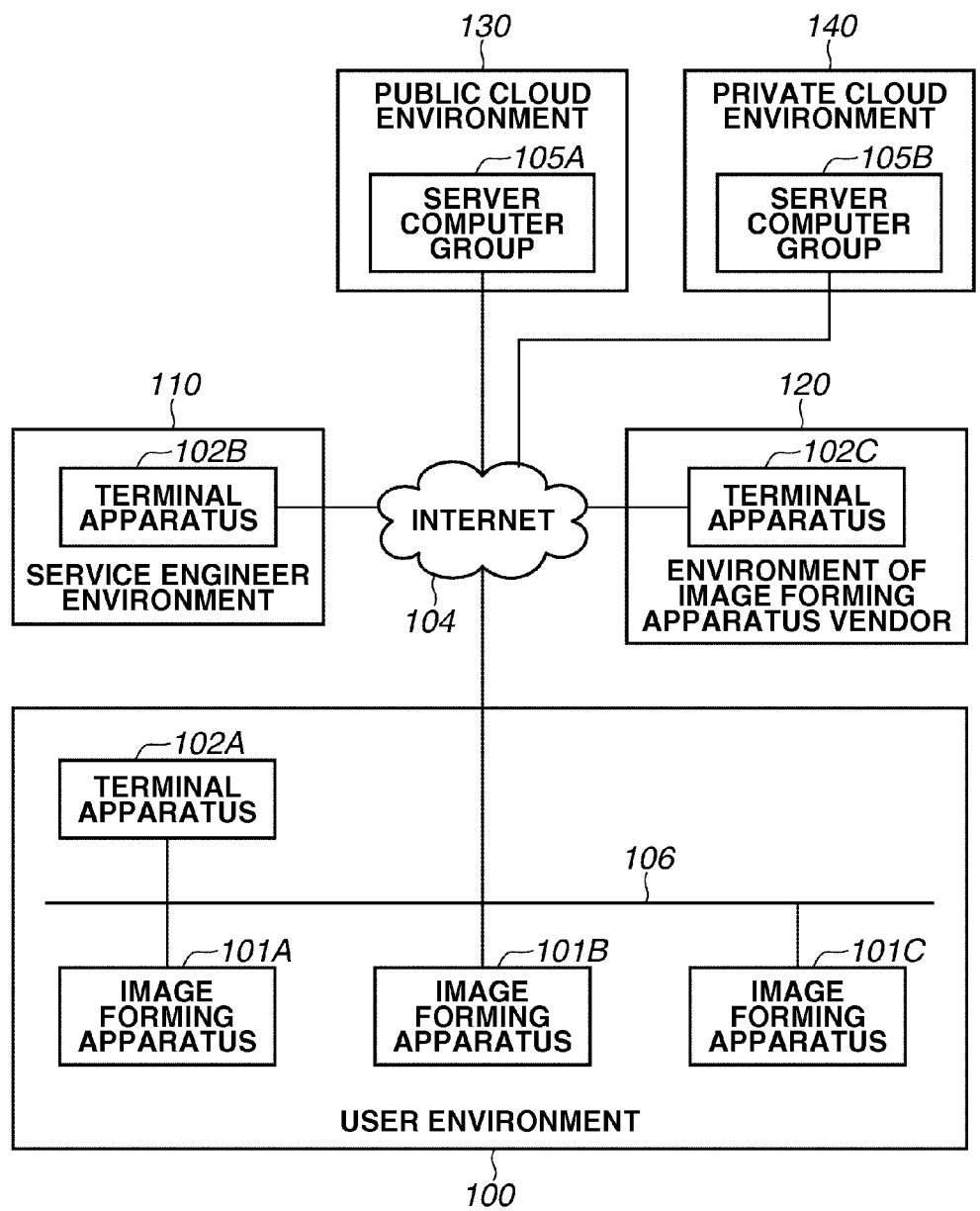
FIG. 1 illustrates an example of an overall configuration of an information processing system according to an exemplary embodiment of the present invention.

Various exemplary embodiments, features, and aspects of the invention will be described in detail below with reference to the drawings.

First, before describing an information processing system according to an exemplary embodiment of the present invention, terminology used to describe the present embodiment will be provided. Configuration data is operation setting information used for changing operation of an image forming apparatus. The configuration data is, for example, a default value regarding imposition of pages in a copy job. If a default value of the imposition of a copy job is set to "1-up", one page is printed on one sheet of paper when the copying is performed. If a default value of the imposition of a copy job is set to "2-up", two pages will be printed on one sheet of paper when the copying is performed.

Device configuration data is data of the configuration of the devices in the image forming apparatus. For example, the device configuration data includes information about whether the image forming apparatus is equipped with a facsimile (fax) unit. The device configuration data includes a model code used for uniquely identifying the model of the image forming apparatus and the version of the firmware which is operating.

A model-based setting value schema is data used for defining a schema of the configuration data of a specified model stored in the image forming apparatus. A schema is data used for defining regulations and positions of the configuration data. The model-based setting value schema includes, for example, conditions used for activating a setting value identifier, a default value, a value range, and data of the configuration data. According to at least one embodiment, different configuration data is stored depending on the model. Thus, a setting value schema is prepared for each type of model.

A virtual device is a data group of a real device stored in a server computer group. More specifically, the virtual device includes at least device configuration data and configuration data. A tenant is a unit of contractors that provide the management service of the image forming apparatus to the user. A tenant identifier is used for uniquely identifying the tenant. For example, if a corporation contracts out a management service of image forming apparatuses 101A, 101B, and 101C in a user environment 100, as in FIG. 1, a tenant identifier corresponding to the user environment 100 will be assigned to a tenant. Then, the image forming apparatuses 101A, 101B, and 101C are considered to belong to the tenant identified by the tenant identifier, and are managed by the tenant.

In order to distinguish data in a virtual device, data stored in a real device, and data unique to a tenant, the data is defined as follows. Device configuration data in a virtual device is hereinafter referred to as virtual device configuration data and configuration data in a virtual device is hereinafter referred to as virtual configuration data. Device configuration data in a real device is hereinafter referred to as real device configuration data and configuration data in a real device is hereinafter referred to as real configuration data. Further, configuration data that is used in common in the tenant is hereinafter referred to as tenant configuration data.

FIG. 1 illustrates an example of an overall configuration of the information processing system according to one of the present embodiments. The information processing system illustrated in FIG. 1 includes the user environment 100, a service engineer environment 110, a vendor environment 120 (environment of the vendor of the image forming apparatus), a public cloud environment 130, and a private cloud environment 140. Apparatuses in these environments communicate with one another via the Internet 104. The Internet 104 is used for digital communication on a public line.

The user environment 100 is an environment in which the user of the image forming apparatuses executes the operations of the image forming apparatuses. The user environment 100 includes the image forming apparatuses 101A, 101B, and 101C as well as a terminal apparatus 102A. The image forming apparatuses 101A, 101B, and 101C are the image forming apparatuses of the present embodiment. A network 106 is used for digital communication in the user environment 100. The image forming apparatuses 101A to 101C can access the Internet 104 via the network 106. The terminal apparatus 102A is a computer which the user of the user environment 100 operates. The terminal apparatus 102A can also access the Internet 104 via the network 106.

The service engineer environment 110 is an environment in which a service engineer manages the image forming apparatuses using a terminal apparatus 102B. The service engineer environment 110 includes the terminal apparatus 102B. The terminal apparatus 102B is operated by the service engineer that manages the image forming apparatuses 101A, 101B, and 101C. The terminal apparatus 102B can also access the Internet 104.

The vendor environment 120 is an environment in which a person in charge of management and who belongs to a vendor performs maintenance of data necessary in managing the image forming apparatuses. The vendor is the manufacturer of the image forming apparatuses. The vendor environment 120 includes a terminal apparatus 102C. The terminal apparatus 102C is operated by the person in charge of management of the vendor of the image forming apparatuses. The terminal apparatus 102C can also access the Internet 104.

The public cloud environment 130 is an environment for providing a setting value management service (see FIG. 3) regarding management of the configuration data of the image forming apparatuses. The public cloud environment 130 provides its service to a plurality of tenants. The public cloud environment 130 includes a server computer group 105A.

The server computer group 105A is a group of servers that provide services via the Internet 104. For example, the server computer group 105A provides a setting value management service 310A illustrated in FIG. 3. In at least one of the present embodiments, the setting value management service 310A provided by the server computer group 105A functions as a management apparatus that manages the configuration data of the image forming apparatuses. The setting value management service 310A manages the image forming apparatuses in association with a tenant as a predetermined management unit.

The public cloud environment 130, and the private cloud environment 140, are environments for providing a setting value management service for management of the configuration data of the image forming apparatuses. However, unlike the public cloud environment, the private cloud environment provides services for a specific tenant. The private cloud environment 140 includes a server computer group 105B.

As with the server computer group 105A, the server computer group 105B is a group of servers that provide services via the Internet 104. The server computer group 105B provides, for example, a setting value management service 310B illustrated in FIG. 3. According to the present embodiment, the setting value management service 310B provided by the server computer group 105B functions as a management apparatus that manages the configuration data of the image forming apparatuses. The configuration of the server computer group 105B is similar to that of the server computer group 105A.

Although the private cloud environment 140 is connected to the user environment 100 via the Internet 104 in FIG. 1, the private cloud environment 140 can be provided in the user environment 100. Further, the private cloud environment 140 can be included in the service engineer environment 110 or the vendor environment 120. In the description below, the image forming apparatuses 101A, 101B, and 101C are also collectively referred to as an image forming apparatus 101. Further, the terminal apparatuses 102B and 102C are also collectively referred to as a terminal apparatus 102.

Figure 2:
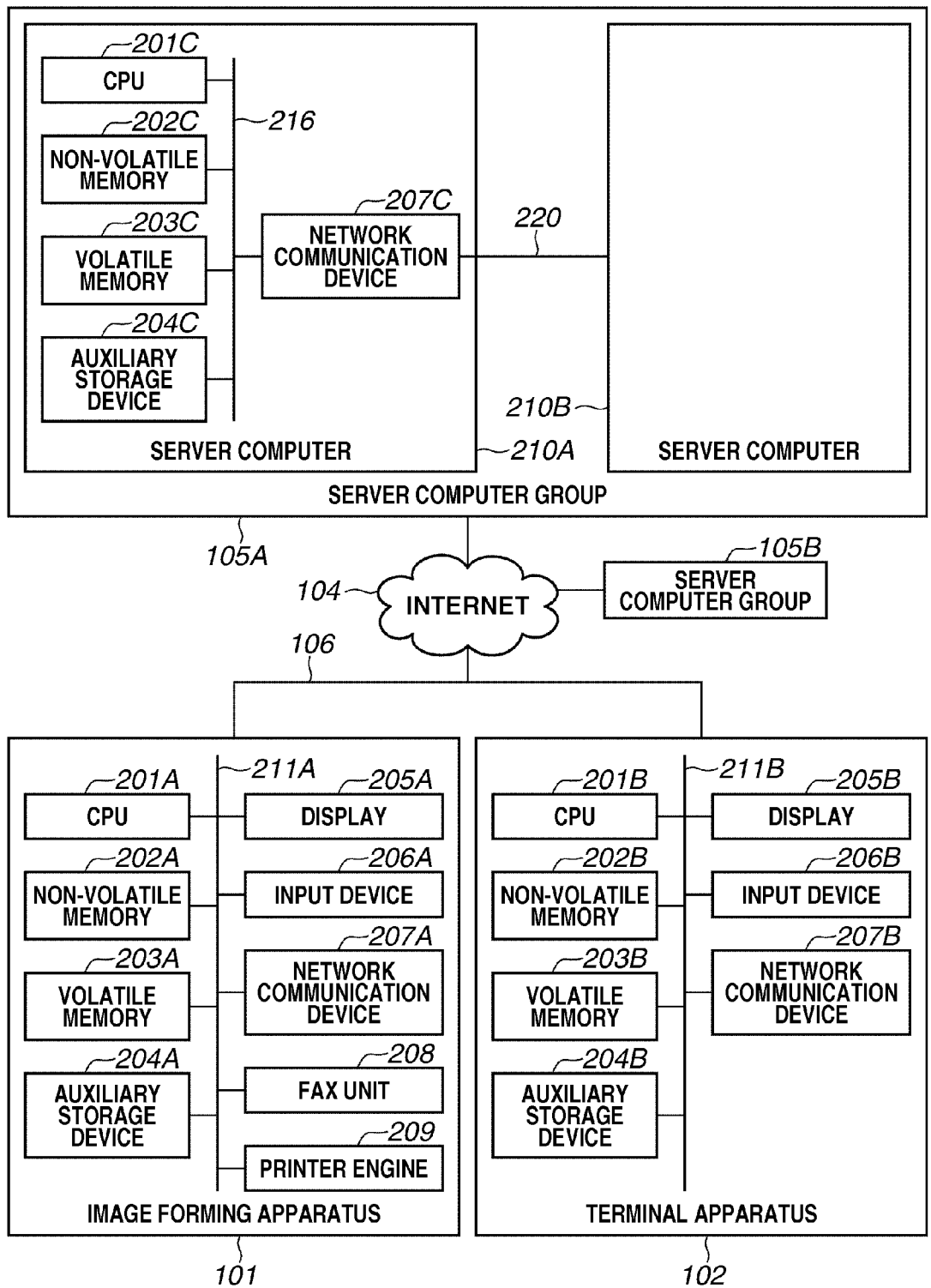
FIG. 2 illustrates an example of a hardware configuration of the information processing system according to the present embodiment.

FIG. 2 illustrates an example of a hardware configuration of the information processing system according to the present embodiment. The server computer group 105A includes a server computer 210A and a server computer 210B. The configuration of the server computer 210B is similar to that of the server computer 210A. The server computer 210A and the server computer 210B communicate with each other via a network 220. The server computer 210A includes various devices such as a central processing unit (CPU) 201C and a network communication apparatus 207C. The devices are connected via an internal bus 216.

The image forming apparatus 101 includes various devices including a CPU 201A and a printer engine 209, which are connected via an internal bus 211A. Further, the terminal apparatus 102 includes various devices including a CPU 201B and a network communication apparatus 207B. The devices are connected via an internal bus 211B.

In the description below, the CPUs 201A, 201B, and 201C are also collectively referred to as a CPU 201. Further, non-volatile memories 202A, 202B, and 202C are also collectively referred to as a non-volatile memory 202. Volatile memories 203A, 203B, and 203C are also collectively referred to as a volatile memory 203. Auxiliary storage units 204A, 204B, and 204C are also collectively referred to as an auxiliary storage unit 204. Displays 205A and 205B are also collectively referred to as a display 205. Input devices 206A and 206B are also collectively referred to as an input device 206. Network communication apparatuses 207A and 207B are also collectively referred to as a network communication apparatus 207. The internal buses 211A and 211B are also collectively referred to as an internal bus 211.

The CPU 201 executes programs and performs control of various processing. The non-volatile memory 202 includes a read-only memory (ROM). Programs and data necessary when an apparatus is started are stored in the non-volatile memory 202. The volatile memory 203 includes a random access memory (RAM). The volatile memory 203 is used as a temporary storage area of a programs and data.

The auxiliary storage unit 204 is a mass storage device such as a hard disk or a RAM drive. The auxiliary storage unit 204 stores a large amount of data and execution codes of programs. The auxiliary storage unit 204 stores data which needs to be stored for a longer period than the volatile memory 203. The display 205 displays information for the user or the service engineer.

The input device 206 accepts a selection instruction input by the user or the service engineer and transmits it to a program via the internal bus 211. The network communication apparatus 207 communicates with an external apparatus via the network. A fax unit 208 is a hardware unit that transmits image data formed by the image forming apparatus 101 or image data stored in the auxiliary storage unit 204A to an external apparatus via the network 106. The fax unit 208 is an optional unit and the image forming apparatus 101 is not necessarily equipped with the fax unit 208. The printer engine 209 prints image data formed by the image forming apparatus 101 or image data stored in the auxiliary storage unit 204A on a paper medium.

Figure 3:
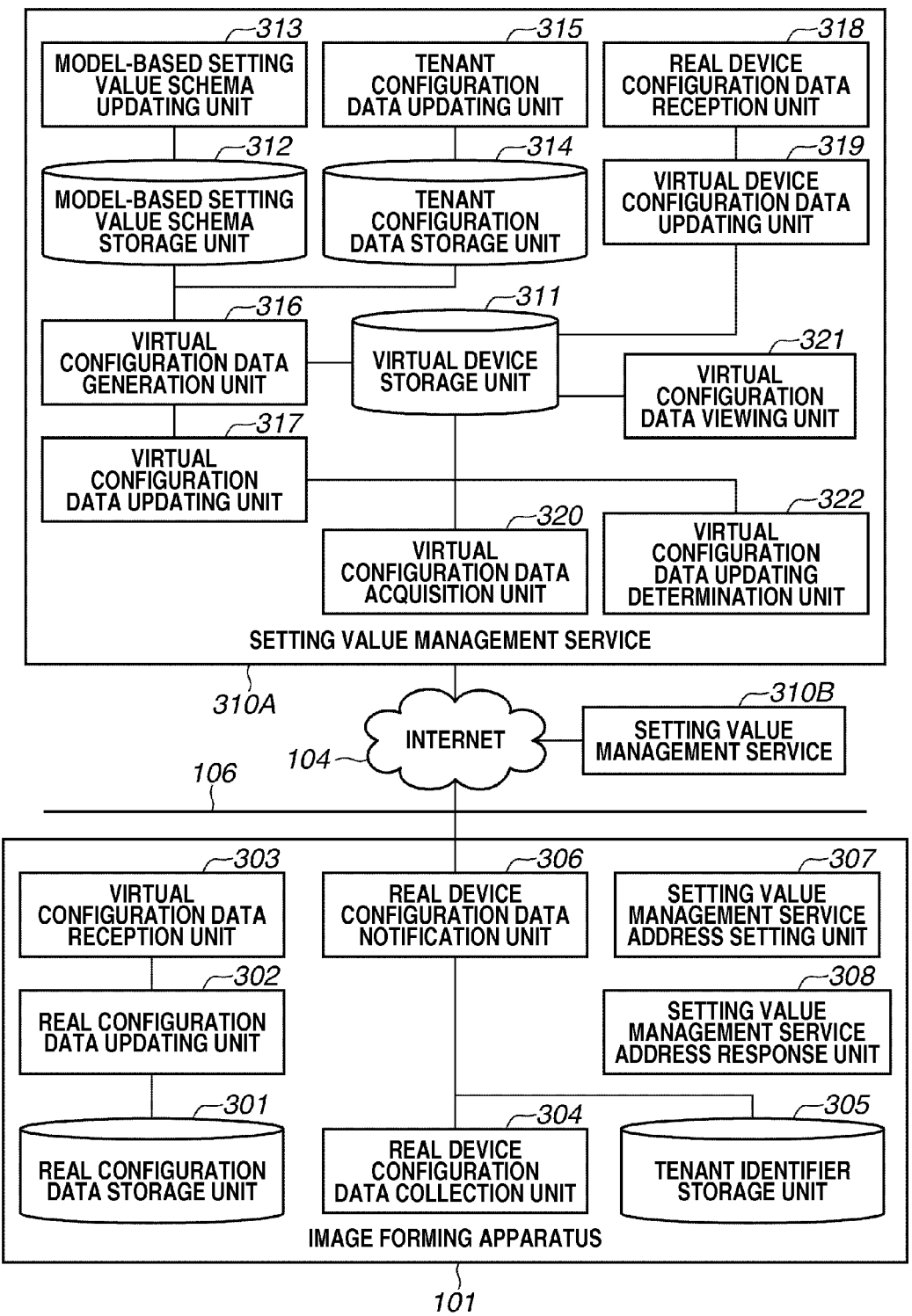
FIG. 3 illustrates an example of a function block diagram of the information processing system according to the present embodiment.

FIG. 3 illustrates an example of a function block diagram of the information processing system according to the present embodiment. The information processing system illustrated in FIG. 3 includes the image forming apparatus 101, the setting value management service 310A, and the setting value management service 310B. The image forming apparatus 101, the setting value management service 310A, and the setting value management service 310B communicate with one another via the Internet 104. The setting value management service 310A and the setting value management service 310B are collectively referred to as a setting value management service 310. The management method and the computer program of the present embodiment are realized by units of the information processing system illustrated in FIG. 3.

The image forming apparatus 101 includes a real configuration data storage unit 301, a real configuration data updating unit 302, a virtual configuration data reception unit 303, a real device configuration data collection unit 304, a tenant identifier storage unit 305, and a real device configuration data notification unit 306. Further, the image forming apparatus 101 includes a setting value management service address setting unit 307 and a setting value management service address response unit 308.

The real configuration data storage unit 301 stores configuration data of the image forming apparatus 101. More specifically, the real configuration data storage unit 301 stores and manages the configuration data in the auxiliary storage unit 204A. The operation of the image forming apparatus 101 is changed based on the real configuration data stored in the real configuration data storage unit 301.

The real configuration data updating unit 302 updates the real configuration data stored in the real configuration data storage unit 301. More specifically, the real configuration data updating unit 302 updates the real configuration data by using the virtual configuration data acquired from the virtual configuration data reception unit 303.

The virtual configuration data reception unit 303 acquires the virtual configuration data from a virtual configuration data acquisition unit 320 in the setting value management service 310A. In other words, from the virtual configuration data acquisition unit 320, the virtual configuration data reception unit 303 receives the virtual configuration data which the virtual configuration data acquisition unit 320 has acquired. The virtual configuration data reception unit 303 invokes the virtual configuration data acquisition unit 320 by using an address set in the configuration data stored in the real configuration data storage unit 301.

FIGS. 4A, 4B, and 4C illustrate examples of the real configuration data. FIG. 4A illustrates the real configuration data of an image forming apparatus with a device identifier 010001. FIG. 4B illustrates the real configuration data of an image forming apparatus with a device identifier 010002. FIG. 4C illustrates the real configuration data of an image forming apparatus with a device identifier 020001. The device identifier is identification information used for uniquely identifying the image forming apparatus.

The real configuration data includes data items such as a setting value identifier 702 and a value 703. The setting value identifier 702 is used for uniquely identifying a setting item. The value 703 is a value of the setting item. According to the examples illustrated in FIGS. 4A, 4B, and 4C, "http://ddd.com/config" is set as a value (address) of "device_settings.cloud_address". This address is the setting value management service address which distributes the configuration data to the image forming apparatus 101. Thus, the above-described virtual configuration data reception unit 303 accesses this address.

When the image forming apparatus is shipped from the factory, the setting value management service address 310A in the public cloud environment is set in the real configuration data as the address to be accessed. According to processing of the setting value management service address setting unit 307 described below, this address can be changed to the address of the setting value management service 310B.

The data configuration of the virtual configuration data is similar to the data configuration of the real configuration data illustrated in FIGS. 4A, 4B, and 4C.

Referring again to FIG. 3, the real device configuration data collection unit 304 collects device configuration data (real device configuration data) of the image forming apparatus 101.

Figure 5A:
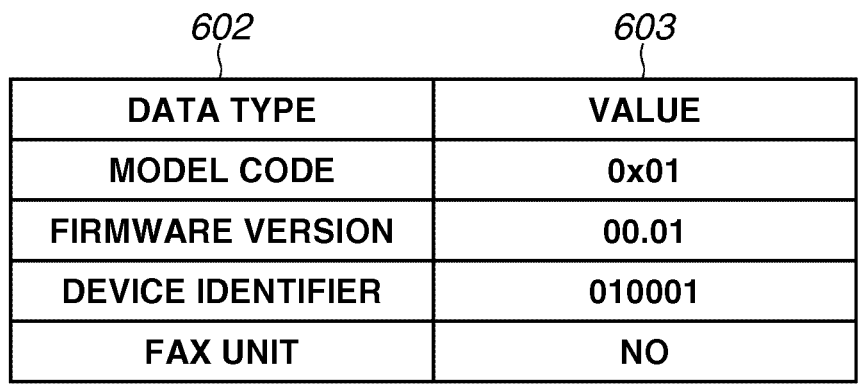
FIGS. 5A, 5B, and 5C illustrates examples of real device configuration data.
Figure 5B:
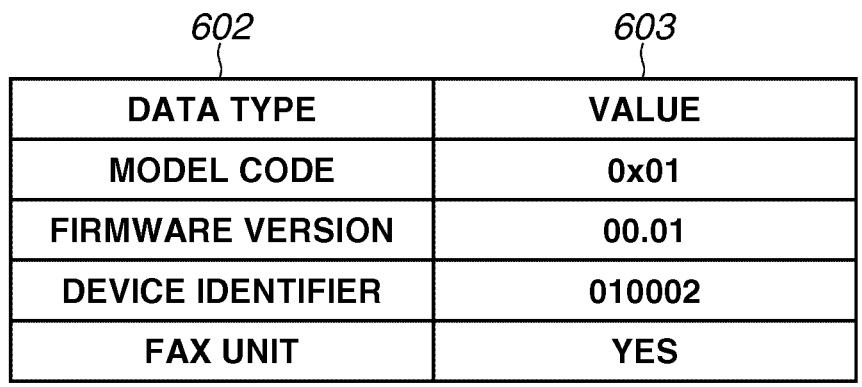
Figure 5C:
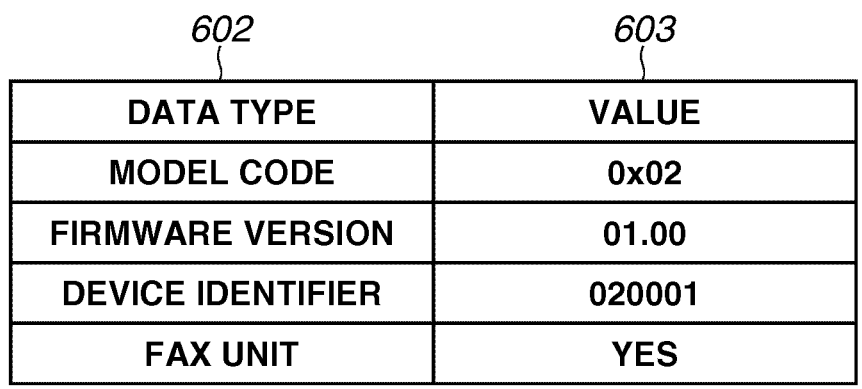

FIGS. 5A, 5B, and 5C illustrate examples of the real device configuration data. Each of FIGS. 5A, 5B, and 5C illustrates real device configuration data of different image forming apparatuses. The real device configuration data includes data items such as a data type 602 and a value 603. The data type 602 includes information of a type of data included in the real device configuration data. The data type 602 includes information such as a model code used for identifying a model, a firmware version, and a device identifier used for identifying a device. The value 603 is a value of the corresponding data type. According to the examples in FIGS. 5A to 5C, values that correspond to the data types (e.g., values of the device identifier and presence/absence of a fax unit) are set for the value 603. The data configuration of the virtual device configuration data is similar to the data configuration of the real device configuration data.

The tenant identifier storage unit 305 stores a tenant identifier of a tenant to which the image forming apparatus 101 belongs. The tenant identifier is set when the image forming apparatus 101 is initially installed. Further, the tenant identifier is stored in the auxiliary storage unit 204A so that it is not lost even if the power is turned off.

The real device configuration data notification unit 306 provides the real device configuration data collected by the real device configuration data collection unit 304 and the tenant identifier stored in the tenant identifier storage unit 305 to a real device configuration data reception unit 318 of the setting value management service 310A. Specifically, the real device configuration data notification unit 306 transmits a configuration data generation request, including the real device configuration data and the tenant identifier, to the real device configuration data reception unit 318. This configuration data generation request is an operation setting generation request for generation of virtual configuration data that corresponds to the image forming apparatus 101.

The setting value management service address setting unit 307 acquires and sets an address used for invoking the virtual configuration data acquisition unit 320. If communication to the address set in the real configuration data before the image forming apparatus 101 is shipped from the factory fails, the setting value management service address setting unit 307 executes, for example, the processing below. The following case is where communication to "http://ddd.com/config" (see FIG. 4A), which is set in advance in the real configuration data, fails.

From an image forming apparatus located around the image forming apparatus 101, the setting value management service address setting unit 307 acquires a setting value management service address that manages the configuration data of that image forming apparatus. More specifically, the setting value management service address setting unit 307 multicasts an inquiry to the image forming apparatuses in the vicinity on the network and receives a response. Then, the setting value management service address setting unit 307 sets the acquired address in the real configuration data as the setting value management service address (setting value management service address) to be accessed by the image forming apparatus 101.

The setting value management service address response unit 308 accepts an inquiry from the setting value management service address setting unit 307 of the image forming apparatus located around the image forming apparatus 101. This inquiry is the search packet described below. Then, the setting value management service address response unit 308 responds to the inquiry and informs the setting value management service address setting unit 307 of the address set in the real configuration data, or in other words, of the address set as the access destination of the image forming apparatus 101.

The setting value management service 310A functions as a management apparatus that manages configuration data of the image forming apparatuses in the public cloud environment. As described above, the server computer group 105A provides the setting value management service 310A. The setting value management service 310B functions as a management apparatus that manages configuration data of the image forming apparatuses in the private cloud environment. Further, the server computer group 105B provides the setting value management service 310B. The setting value management service 310A and the setting value management service 310B have a similar configuration.

The setting value management service 310A includes a virtual device storage unit 311, a model-based setting value schema storage unit 312, a model-based setting value schema updating unit 313, a tenant configuration data storage unit 314, and a tenant configuration data updating unit 315. Further, the setting value management service 310A includes a virtual configuration data generation unit 316, a virtual configuration data updating unit 317, the real device configuration data reception unit 318, and a virtual device configuration data updating unit 319. Furthermore, the setting value management service 310A includes the virtual configuration data acquisition unit 320, a virtual configuration data viewing unit 321, and a virtual configuration data updating determination unit 322.

The virtual device storage unit 311 stores a virtual device. The virtual device includes, at least, virtual device configuration data, virtual configuration data, a device identifier of the virtual device, and a tenant identifier. The virtual device storage unit 311 stores the virtual device in the auxiliary storage unit 204C and manages it.

FIG. 6 illustrates an example of the virtual device. The virtual device in FIG. 6 includes a device identifier 802, a tenant identifier 803, virtual device configuration data 804, virtual configuration data 805, and a notification flag 806. The device identifier 802 is identification information used for uniquely identifying a virtual device. The device identifier 802 corresponds to identification information used for uniquely identifying the image forming apparatus 101 that corresponds to the virtual device. The device identifier 802 is included in the device configuration data, which the setting value management service 310 is notified of by the image forming apparatus 101.

The tenant identifier 803 is identification information used for uniquely identifying a tenant that manages the image forming apparatus 101 that corresponds to the virtual device. The virtual device configuration data 804 is identification information used for uniquely identifying virtual device configuration data. The virtual device configuration data corresponds to device configuration data (real device configuration data) of the image forming apparatus 101 that corresponds to the virtual device. The virtual configuration data 805 is identification information used for uniquely identifying virtual configuration data. The virtual configuration data corresponds to configuration data (real configuration data) of the image forming apparatus 101 that corresponds to the virtual device.

The notification flag 806 indicates whether the virtual configuration data 805 is notified to the image forming apparatus. If the notification flag 806 is "unnotified", the virtual configuration data 805 is not notified to the image forming apparatus. If the notification flag 806 is "notified", the virtual configuration data 805 has already been notified to the image forming apparatus.

Referring back again to FIG. 3, the model-based setting value schema storage unit 312 stores a model-based setting value schema. One model-based setting value schema is prepared for each model of the image forming apparatuses.

FIGS. 7A and 7B illustrate examples of the model-based setting value schema. FIG. 7A illustrates a model-based setting value schema corresponding to a model whose model code is 0x01. FIG. 7B illustrates a model-based setting value schema corresponding to a model whose model code is 0x02. Each model-based setting value schema includes data items such as a setting value identifier 402, a default value 403, a value range 404, and a condition 405.

The setting value identifier 402 is identification information used for uniquely identifying a setting item. For example, "copy_settings.nup" is a setting item regarding imposition of pages when the pages are copied. That models have a same setting value identifier 402 suggests that they have the same setting item, even if they are different models. The default value 403 is a default setting value of the corresponding model. The value range 404 suggests a settable range corresponding to the model. For example, regarding the value range 404 of "copy_settings.nup", N-up copying can be selected from three types: "1-up", "2-up", and "4-up" according to this model.

The condition 405 is necessary in using the setting value of the corresponding model. For example, "fax unit" is set for the condition 405 of the setting item "fax_settings.received_print". Thus, the setting value of this setting item is effective only when the imaging apparatus is equipped with a fax unit.

Referring back again to FIG. 3, the model-based setting value schema updating unit 313 updates the model-based setting value schema stored in the model-based setting value schema storage unit 312. For example, if a new model is introduced by a vendor of the image forming apparatuses, according to an instruction issued by a person responsible for the management of the vendor, a model-based setting value schema that corresponds to the new model will be registered. Further, if a change is made in the setting items, the model-based setting value schema updating unit 313 updates the model-based setting value schema.

The tenant configuration data storage unit 314 stores the configuration data which the tenant desires to set for the image forming apparatus.

Figure 8:
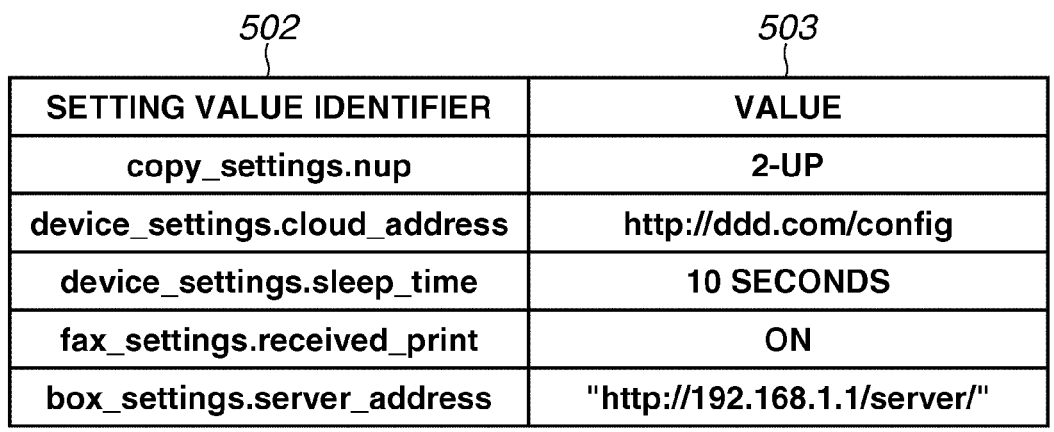
FIG. 8 illustrates an example of tenant configuration data.

FIG. 8 illustrates an example of the tenant configuration data. The tenant configuration data includes data items such as a setting value identifier 502 and a value 503. The setting value identifier 502 is similar to the setting value identifier 402 in the model-based setting value schema illustrated in FIGS. 7A and 7B. The value 503 is a common setting value which the tenant desires to set. In FIG. 8, "2-up" is set for "copy_settings.nup". This suggests that the tenant desires to set "2-up" for all the apparatuses that the tenant.

Referring back again to FIG. 3, the tenant configuration data updating unit 315 updates the tenant configuration data stored in the tenant configuration data storage unit 314. According to an operation of the service engineer responsible for management of the image forming apparatuses which the tenant manages, the terminal apparatus 102B in the service engineer environment 110 issues an update instruction of the tenant configuration data. Then, the tenant configuration data updating unit 315 updates the tenant configuration data according to this update instruction. The service engineer performs the operation using the setting screen displayed on the web browser that operates in the terminal apparatus 102B.

The virtual configuration data generation unit 316 generates the virtual configuration data based on the model-based setting value schema, the tenant configuration data, and the virtual device configuration data. First, the virtual configuration data generation unit 316 acquires the virtual device configuration data illustrated in FIG. 5A from the virtual device storage unit 311.

Next, the virtual configuration data generation unit 316 refers to the model code included in the acquired virtual device configuration data and specifies the model of the image forming apparatus. Taking the virtual device configuration data illustrated in FIG. 5A as an example, 0x01 is determined as the value of the model code. Thus, the virtual configuration data generation unit 316 specifies a model with a model code of 0x01 as the model of the image forming apparatus.

Next, the virtual configuration data generation unit 316 acquires a model-based setting value schema that corresponds to the specified model code from the model-based setting value schema storage unit 312. The virtual configuration data generation unit 316 acquires, for example, the model-based setting value schema illustrated in FIG. 7A that matches the model code 0x01.

Next, the virtual configuration data generation unit 316 sets the setting value defined by the acquired model-based setting value schema as abase of the virtual configuration data. Taking the model-based setting value schema in FIG. 7A as an example, the virtual configuration data generation unit 316 sets the setting values that correspond to the five setting items ("copy_settings.nup" to "box_settings.server_address").

Subsequently, the virtual configuration data generation unit 316 acquires the tenant configuration data illustrated in FIG. 8 from the tenant configuration data storage unit 314. The virtual configuration data generation unit 316 determines whether the setting value in the tenant configuration data is within the value range defined by the model-based setting value schema.

Referring to the tenant configuration data illustrated in FIG. 8 and the model-based setting value schema illustrated in FIG. 7A, the value (setting value) of the setting item "copy_settings.nup" in the tenant configuration data is "2-up", whereas the value range that corresponds to the setting item defined by the model-based setting value schema is "1-up", "2-up", and "4-up". Thus, the setting value in the tenant configuration data is within the value range defined by the model-based setting value schema.

Further, the value (setting value) of the setting item "device_settings.sleep_time" included in the tenant configuration data is "10 seconds", whereas the value range that corresponds to the setting item defined by the model-based setting value schema is "1 minute", "10 minutes", and "one hour". Thus, the setting value in the tenant configuration data is not within the value range defined by the model-based setting value schema.

If the setting value included in the tenant configuration data is not within the value range defined by the model-based setting value schema, the virtual configuration data generation unit 316 acquires a default value defined in the model-based setting value schema. According to the example in FIG. 7A, a default value of "10 minutes" is acquired. The virtual configuration data generation unit 316 uses the acquired default value as the setting value of the setting item of the virtual configuration data.

If the setting value in the tenant configuration data is within the value range defined by the model-based setting value schema, the virtual configuration data generation unit 316 sets the setting value in the tenant configuration data as the setting value that corresponds to the setting item of the virtual configuration data.

Next, the virtual configuration data generation unit 316 determines whether the virtual device configuration data satisfies the conditions defined in the model-based setting value schema. Referring to the model-based setting value schema illustrated in FIG. 7A, there is no conditions for "copy_settings.nup". Thus, the virtual device configuration data illustrated in FIG. 5A satisfies the condition for "copy_settings.nup".

However, although the condition that corresponds to "fax_settings.received_print" is "fax unit", "none" is set as the value of "fax unit" in the virtual device configuration data. Thus, the virtual device configuration data does not satisfy the conditions of the setting items.

If the virtual device configuration data does not satisfy the conditions defined in the model-based setting value schema, the virtual configuration data generation unit 316 acquires the default value 403 defined in the model-based setting value schema. According to the example in FIG. 7A, the virtual configuration data generation unit 316 acquires "OFF" as the default value that corresponds to "fax_settings. received_print". The virtual configuration data generation unit 316 uses the acquired default value as the setting value of the setting item of the virtual configuration data.

Referring back again to FIG. 3, the virtual configuration data updating unit 317 updates the virtual configuration data in the virtual device stored in the virtual device storage unit 311 by the virtual configuration data generated by the virtual configuration data generation unit 316.

More specifically, the virtual configuration data updating unit 317 acquires a virtual device with a device identifier that corresponds to the generated virtual configuration data from the virtual devices stored in the virtual device storage unit 311. Then, the virtual configuration data updating unit 317 updates the virtual configuration data of the acquired virtual device by the generated virtual configuration data.

Further, if the notification flag 806 of the virtual device is "notified", the virtual configuration data updating unit 317 sets the notification flag 806 to "unnotified". If the notification flag 806 is set to "unnotified", it means that there has been a change in the virtual configuration data that corresponds to the image forming apparatus and the image forming apparatus needs to refer to the new virtual configuration data.

The real device configuration data reception unit 318 receives the device configuration data (see FIGS. 5A, 5B, and 5C) and the tenant identifier from the real device configuration data notification unit 306 of the image forming apparatus 101. The virtual device configuration data updating unit 319 updates the virtual device configuration data in the virtual device stored in the virtual device storage unit 311 by the device configuration data received by the real device configuration data reception unit 318. More specifically, the virtual device configuration data updating unit 319 acquires a virtual device with a device identifier which is set in the device configuration data received by the real device configuration data reception unit 318 from the virtual devices stored in the virtual device storage unit 311. Then, the virtual device configuration data updating unit 319 updates the virtual device configuration data in the acquired virtual device by the device configuration data received by the real device configuration data reception unit 318.

The virtual configuration data acquisition unit 320 receives an acquisition request for the virtual configuration data from the virtual configuration data reception unit 303 of the image forming apparatus 101 via the Internet 104. Then, the virtual configuration data acquisition unit 320 acquires the virtual configuration data from the virtual device storage unit 311.

The acquisition request for the virtual configuration data includes at least the device identifier used for specifying the virtual device. Thus, the virtual configuration data acquisition unit 320 searches a virtual device with a device identifier included in the acquisition request for the virtual configuration data. When the virtual configuration data acquisition unit 320 acquires the virtual configuration data in the searched virtual device, the virtual configuration data acquisition unit 320 provides the acquired virtual configuration data to the requestor, in other words, the virtual configuration data reception unit 303 via the Internet 104.

The virtual configuration data viewing unit 321 receives a request for viewing configuration data from an external apparatus via the Internet 104. The configuration data viewing request is a request using the HyperText Transfer protocol (HTTP). The virtual configuration data viewing unit 321 acquires the virtual configuration data that corresponds to the viewing request, generates a page using HyperText Markup Language (HTML) for viewing the acquired virtual configuration data, and returns it to the requestor.

The virtual configuration data updating determination unit 322 determines whether the virtual configuration data is updated. More specifically, the virtual configuration data reception unit 303 in the image forming apparatus 101 transmits the device identifier of the image forming apparatus 101 to the virtual configuration data updating determination unit 322 via the Internet 104. The virtual configuration data updating determination unit 322 searches a virtual device that matches the received device identifier from the virtual devices stored in the virtual device storage unit 311. The virtual configuration data updating determination unit 322 refers to the notification flag 806 of the searched virtual device.

If the notification flag 806 is "unnotified", the virtual configuration data updating determination unit 322 determines that the virtual configuration has been updated. If the notification flag 806 is "notified", the virtual configuration data updating determination unit 322 determines that the virtual configuration data is not updated. The virtual configuration data updating determination unit 322 returns a response indicating whether the virtual configuration data has been updated to the virtual configuration data reception unit 303. Then, the virtual configuration data reception unit 303 that has determined that the virtual configuration data has been updated issues an acquisition request for configuration data to the virtual configuration data acquisition unit 320 of the setting value management service 310A.

The virtual configuration data updating determination unit 322 can determine whether the virtual configuration data has been updated when the virtual configuration data is updated by the virtual configuration data updating unit 317. Then, if the virtual configuration data updating determination unit 322 determines that the virtual configuration data has been updated, the virtual configuration data acquisition unit 320 can acquire the configuration data and transmit it to the virtual configuration data of the image forming apparatus 101.

Figure 9:
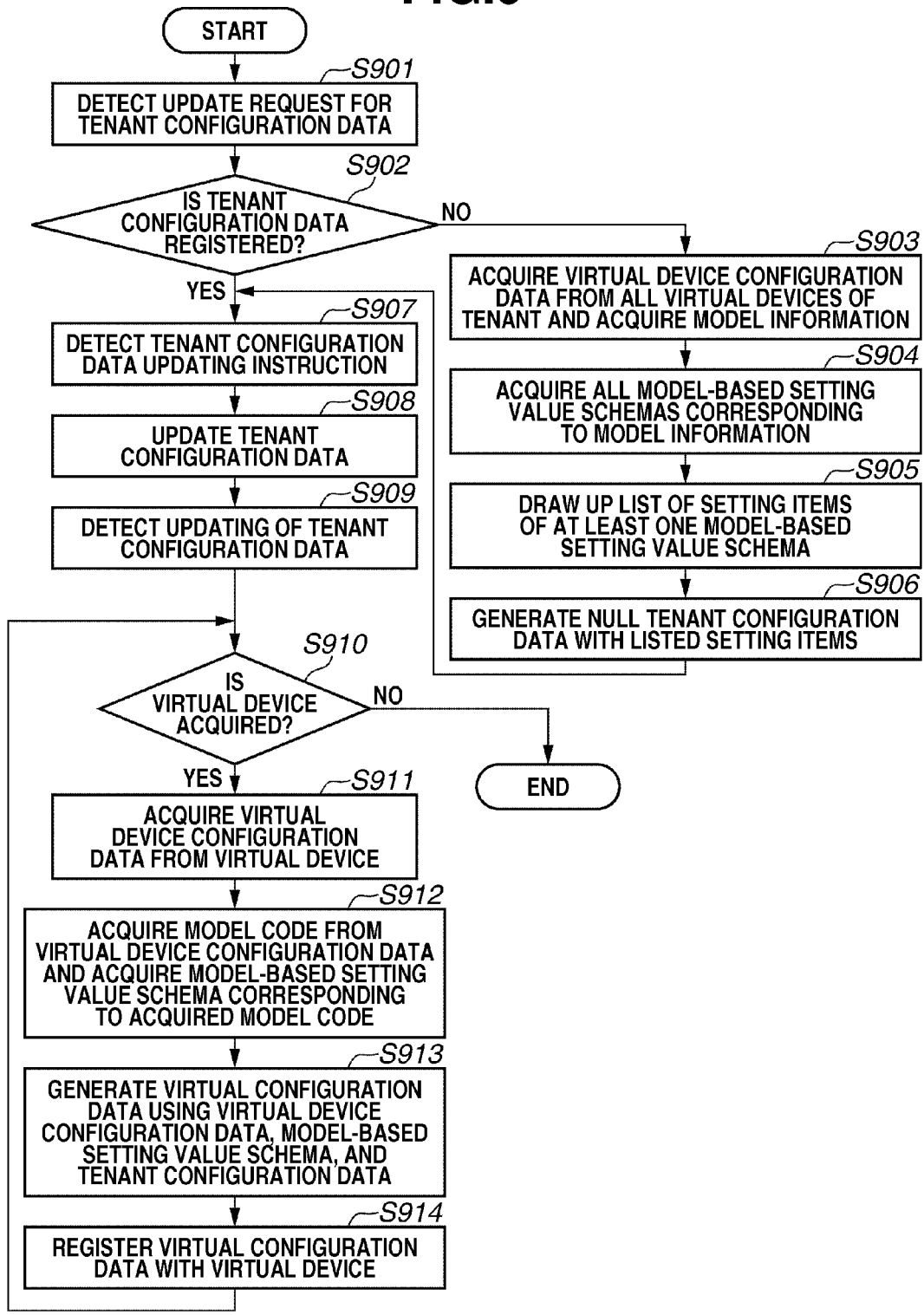
FIG. 9 is a flowchart illustrating an example of update processing of the tenant configuration data.

FIG. 9 is a flowchart illustrating an example of the update processing of the tenant configuration data. According to this example, the administrator user updates the tenant configuration data by using the terminal apparatus 102A. The program that realizes the processing of each step of the flowchart is stored in the non-volatile memory 202C, the volatile memory 203C, or the auxiliary storage unit 204C, and executed by the CPU 201C.

In step S901, the tenant configuration data updating unit 315 detects an update request for tenant configuration data transmitted from the terminal apparatus 102A. In step S902, the tenant configuration data updating unit 315 determines whether tenant configuration data that corresponds to the update request for tenant configuration data is stored in the tenant configuration data storage unit 314. If tenant configuration data that corresponds to the update request for tenant configuration data is stored (YES in step S902), the processing proceeds to step S907. If tenant configuration data that corresponds to the update request for tenant configuration data is not stored (NO in step S902), the processing proceeds to step S903.

In step S903, the tenant configuration data updating unit 315 acquires virtual devices that the tenant stores from the virtual device storage unit 311. Further, the tenant configuration data updating unit 315 acquires the virtual device configuration data in the acquired virtual devices, and also acquires model codes included in the acquired virtual device configuration data.

In step S904, the tenant configuration data updating unit 315 acquires model-based setting value schemas corresponding to the acquired model codes from the model-based setting value schema storage unit 312. In step S905, the tenant configuration data updating unit 315 draws up a list of setting items of at least one model-based setting value schema acquired in step S904. In step S906, the tenant configuration data updating unit 315 generates a null tenant configuration data having the setting items listed in step S905, and the processing proceeds to step S907.

In step S907, the tenant configuration data updating unit 315 detects a concrete instruction for updating the tenant configuration data. In step S908, the tenant configuration data updating unit 315 updates the tenant configuration data based on the update instruction detected in step S907. The tenant configuration data storage unit 314 stores the updated tenant configuration data.

In step S909, the virtual configuration data generation unit 316 determines that the tenant configuration data has been updated. Then, from the virtual devices stored in the virtual device storage unit 311, the virtual configuration data generation unit 316 searches a virtual device that matches the tenant identifier in the tenant configuration data whose update has been detected. Since the processing is sequentially performed with respect to the searched virtual devices, the virtual configuration data generation unit 316 acquires one virtual device.

In step S910, the virtual configuration data generation unit 316 determines whether a virtual device has been acquired. If the processing has been sequentially performed with respect to all the virtual devices and the next virtual device no longer exists (NO in step S910), the processing ends. If the virtual configuration data generation unit 316 acquires the next virtual device (YES in step S910), the processing proceeds to step S911.

In step S911, the virtual configuration data generation unit 316 acquires virtual device configuration data from the virtual device to be processed. In step S912, the virtual configuration data generation unit 316 acquires a model code from the virtual device configuration data acquired in step S911. Further, the virtual configuration data generation unit 316 acquires a model-based setting value schema that corresponds to the acquired model code from the model-based setting value schema storage unit 312.

In step S913, the virtual configuration data generation unit 316 generates virtual configuration data based on the virtual device configuration data, the model-based setting value schema, and the tenant configuration data. In step S914, the virtual configuration data updating unit 317 registers the generated virtual configuration data with the virtual device, and the processing returns to step S910. According to the processing in step S914, the updated tenant configuration data is reflected to the virtual configuration data.

Figure 10:
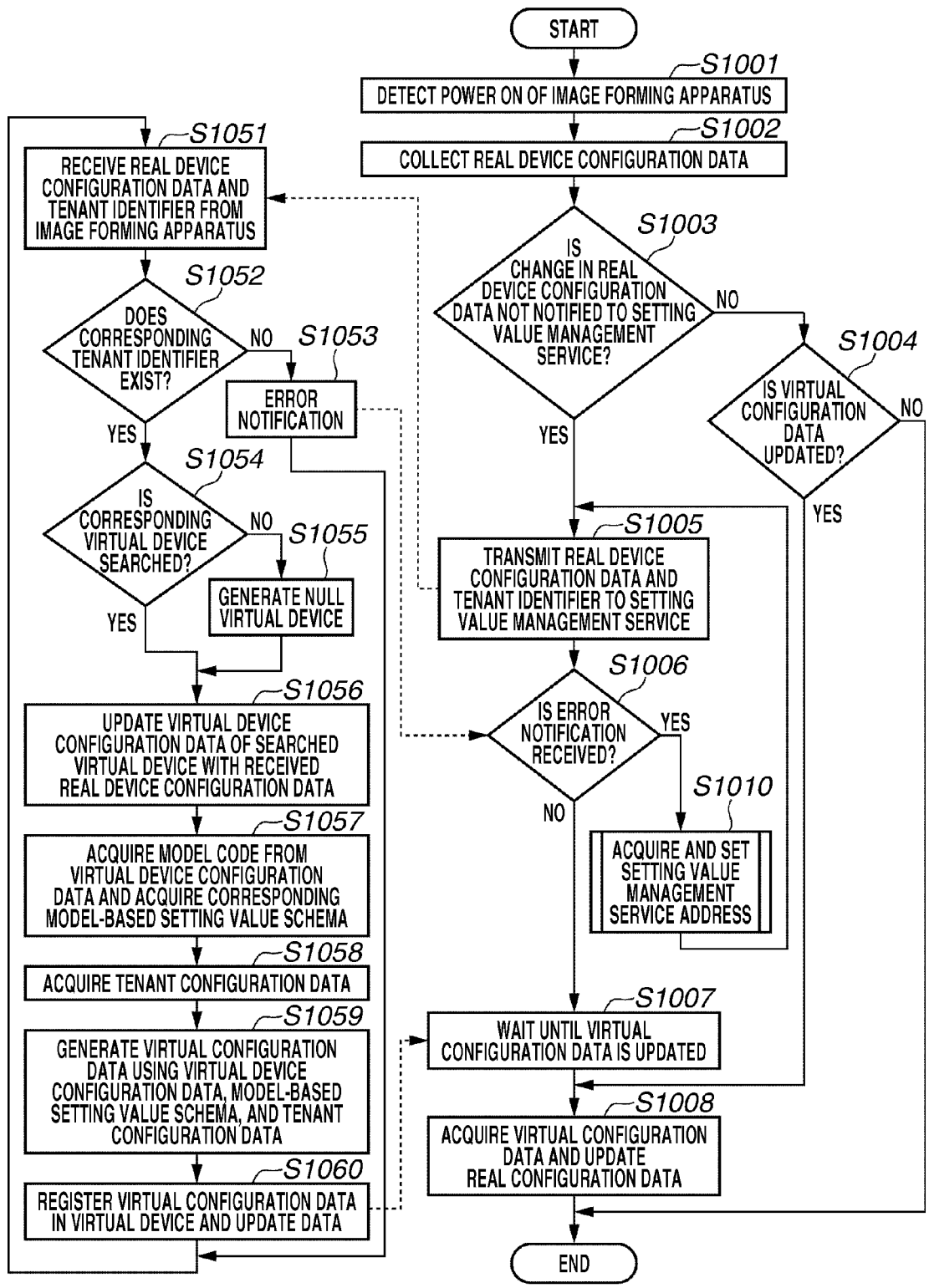
FIG. 10 is a flowchart illustrating acquisition processing of virtual configuration data.

FIG. 10 is a flowchart illustrating an example of the acquisition processing of the virtual configuration data of the image forming apparatus.

Steps S1001 to S1010 in FIG. 10 are executed by the image forming apparatus. A program used for executing these steps is stored in the non-volatile memory 202A, the volatile memory 203A, or the auxiliary storage unit 204A, and executed by the CPU 201A. Further, steps S1051 to S1060 are executed by the server computer group 105. A program used for executing these steps is stored in the non-volatile memory 202C, the volatile memory 203C, or the auxiliary storage unit 204C, and executed by the CPU 201C.

In step S1001, the real device configuration data notification unit 306 of the image forming apparatus 101 determines that the power of the image forming apparatus 101 is turned on. In step S1002, the real device configuration data collection unit 304 collects the real device configuration data.

In step S1003, the real device configuration data notification unit 306 functions as a configuration change determination unit and determines whether a change has been made in the configuration information of the devices included in the image forming apparatus 101. More specifically, based on the real device configuration data collected in step S1002, the real device configuration data notification unit 306 determines whether a change has been made in the real device configuration data which is not yet notified to the setting value management service 310. If a change has been made in the real device configuration data and is not yet notified to the setting value management service 310 (YES in step S1003), the processing proceeds to step S1005. If a change has not been made in the real device configuration data (NO in step S1003), the processing proceeds to step S1004. If a device is newly installed, the processing proceeds to step S1005.

In step S1004, the virtual configuration data reception unit 303 determines whether the latest virtual configuration data is acquired by the device, in other words, whether the device is updated with the virtual configuration data. More specifically, via the Internet 104, the virtual configuration data reception unit 303 determines whether the virtual configuration data is updated by inquiring the virtual configuration data updating determination unit 322 of the setting value management service 310A. Based on a response to the inquiry, the virtual configuration data reception unit 303 determines whether the virtual configuration data is updated. If the virtual configuration data is not updated (NO in step S1004), the processing ends. If the virtual configuration data is updated (YES in step S1004), the processing proceeds to step S1008.

In step S1005, the real device configuration data notification unit 306 transmits a configuration data generation request, which includes the real device configuration data and the tenant identifier, to the setting value management service 310 via the Internet 104. In other words, if a change in the configuration information is determined, the real device configuration data notification unit 306 functions as a request unit that transmits a configuration data generation request including the configuration information which has been changed and the tenant identifier (information of the management unit of the image forming apparatus).

The configuration data generation request is transmitted to the address stored in the real configuration data storage unit 301. The location where the setting value management service 310A in the public cloud environment is provided is set to this address before the image forming apparatus is shipped from the factory. Thus, if a device is newly installed, the real device configuration data and the tenant identifier are notified to the setting value management service 310A in the public cloud environment. In step S1051, the setting value management service 310A receives the configuration data generation request including the configuration information and the tenant identifier. The processing executed by the setting value management service 310A will be described in detail below.

In step S1006, the real device configuration data notification unit 306 determines whether an error notification has been sent from the setting value management service 310A. The real device configuration data notification unit 306 functions as an error notification reception unit that receives an error notification from the setting value management service 310A, which is the destination of the configuration data generation request and which has determined that the configuration data generation request has failed.

If the real device configuration data notification unit 306 determines receipt of an error notification (YES in step S1006), the processing proceeds to step S1010. In step S1010, the setting value management service address setting unit 307 performs acquisition and setting processing of the setting value management service address, and the processing returns to step S1005. Then, once again, the real device configuration data notification unit 306 transmits the real device configuration data and the tenant identifier to the setting value management service 310. The real device configuration data and the tenant identifier are transmitted to the setting value management service address acquired and set in step S1010. Details of the acquisition and setting processing of the setting value management service address will be described below with reference to FIG. 11.

If the real device configuration data notification unit 306 determines that error notification is not received (NO in step S1006), the processing proceeds to step S1007. In step S1007, the virtual configuration data reception unit 303 waits until the updated of the virtual configuration data is completed. In step S1008, the virtual configuration data reception unit 303 acquires the virtual configuration data from the setting value management service 310. The virtual configuration data reception unit 303 functions as an acquisition unit that acquires operation setting information that corresponds to the image forming apparatus 101 from the setting value management service 310 that has generated (updated) the virtual configuration data. Then, the virtual configuration data updating unit 317 updates the real configuration data by using the acquired virtual configuration data. The real configuration data is stored in the real configuration data storage unit 301.

In step S1051, the real device configuration data reception unit 318 of the setting value management service 310 functions as a request accepting unit that receives the configuration data generation request that includes the real device configuration data and the tenant identifier from the image forming apparatus 101.

In step S1052, the virtual device configuration data updating unit 319 determines whether the tenant identifier in the configuration data generation request received in step S1051 is among the tenant identifiers of the tenants managed by the setting value management service 310. In other words, the virtual device configuration data updating unit 319 functions as a determination unit that determines whether the configuration data generation request is successful based on the tenant identifier included in the configuration data generation request and the tenant identifier stored in advance in the storage unit.

If the tenant identifier is among the tenant identifiers of the tenants managed by the setting value management service 310 (YES in step S1052), the virtual device configuration data updating unit 319 determines that the configuration data generation request has been successful. Then, the virtual device configuration data updating unit 319 informs the image forming apparatus 101 that the configuration data generation request has been successful, and the processing proceeds to step S1054.

According to the present embodiment, for example, if the image forming apparatus 101 is installed as a new device in a user environment that uses the private cloud environment including the setting value management service 310B, the image forming apparatus 101 issues a notification to the setting value management service 310A in the public cloud environment using the address which has been set before the apparatus has been shipped from the factory. However, the setting value management service 310A in the public cloud environment does not manage this tenant. Thus, in this case, the virtual device configuration data updating unit 319 determines that the tenant identifier included in the configuration data generation request does not correspond to the tenants managed by the setting value management service 310. In other words, the virtual device configuration data updating unit 319 determines that configuration data generation request has failed. Then, the processing proceeds to step S1053.

In step S1053, the virtual device configuration data updating unit 319 functions as an error notification unit that issues an error notification to the image forming apparatus as the source of the request including the real device configuration data and the tenant identifier, and then the processing returns to step S1051.

In step S1054, the virtual device configuration data updating unit 319 determines whether a virtual device that matches the real device configuration data and the tenant identifier in the configuration data generation request received in step S1051 is searched from the virtual devices stored in the virtual device storage unit 311.

If a virtual device that matches is searched (YES in step S1054), the processing proceeds to step S1056. If a virtual device that matches is not searched (NO in step S1054), the processing proceeds to step S1055. If a device is newly installed and the image forming apparatus communicates with the setting value management service 310 for the first time, the virtual device may not be searched. In this case, the processing proceeds to step S1055. In step S1055, the virtual device configuration data updating unit 319 generates a null virtual device, and the processing proceeds to step S1056.

In step S1056, the virtual device configuration data updating unit 319 updates the virtual device configuration data of the virtual device acquired in step S1054 by the real device configuration data received in step S1051. Further, the virtual device configuration data updating unit 319 sets the real device configuration data received in step S1051 as the virtual device configuration data of the virtual device generated in step S1055. In this manner, the virtual device corresponding to the image forming apparatus 101 is updated.

In step S1057, the virtual configuration data generation unit 316 acquires a model code from the virtual device configuration data updated in step S1056. Then, from the model-based setting value schema storage unit 312, the virtual configuration data generation unit 316 acquires a model-based setting value schema corresponding to the acquired model code.

In step S1058, the virtual configuration data generation unit 316 acquires tenant configuration data. More specifically, from the tenant configuration data stored in the tenant configuration data storage unit 314, the virtual configuration data generation unit 316 acquires tenant configuration data that corresponds to the tenant identifier searched in step S1052.

In step S1059, the virtual configuration data generation unit 316 generates virtual configuration data based on the virtual device configuration data, the model-based setting value schema, and the tenant configuration data. The processing in step S1059 is similar to the processing in step S913 in FIG. 9. If it is determined that the configuration data generation request is successful, the virtual configuration data generation unit 316 functions as a generation unit that generates the configuration data that corresponds to the image forming apparatus 101 based on the configuration information included in the configuration data generation request.

In step S1060, the virtual configuration data updating unit 317 registers the generated virtual configuration data with the corresponding virtual device and updates the data. In step S1060, the virtual configuration data acquisition unit 320 functions as a transmission unit that transmits the generated virtual configuration data to the virtual configuration data reception unit 303 of the image forming apparatus 101. Then, the processing returns to step S1051.

Figure 11:
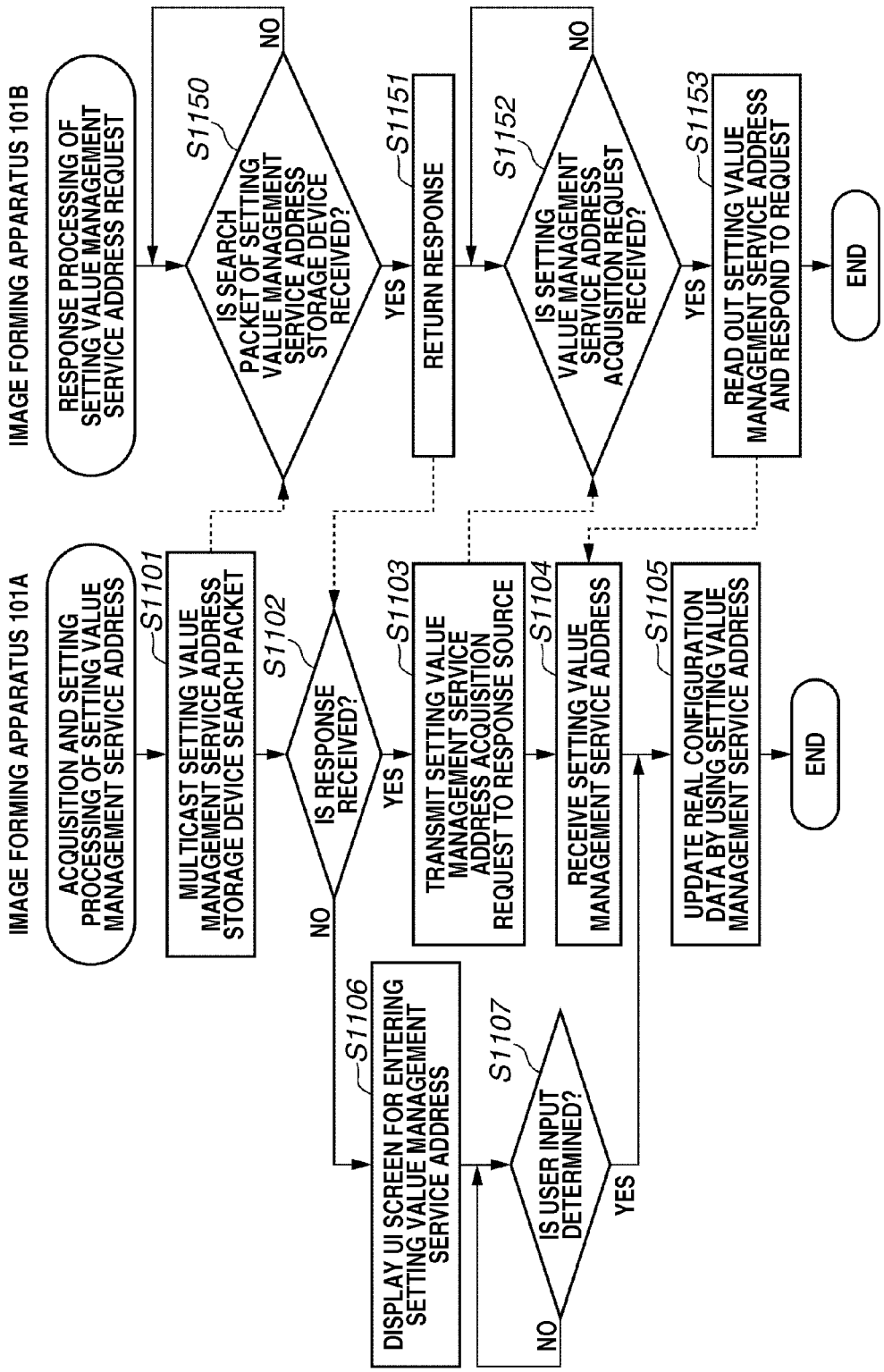
FIG. 11 is a flowchart illustrating an example of setting value management service address acquisition processing.

FIG. 11 is a flowchart illustrating an example of the setting value management service address acquisition processing in step S1010 in FIG. 10. According to the example illustrated in FIG. 11, steps S1101 to S1107 are performed by the image forming apparatus 101A and steps S1150 to S1153 are performed by the image forming apparatus 101B. The image forming apparatus 101B is an example of an image forming apparatus other than the image forming apparatus 101A on the network 106. The program that executes the processing of these steps is stored in the non-volatile memory 202A, the volatile memory 203A, or the auxiliary storage unit 204A, and executed by the CPU 201A.

The image forming apparatus 101B in FIG. 11 is managed by the setting value management service 310B in the private cloud environment 140. In other words, the address of the access destination stored in the real configuration data storage unit 301 of the image forming apparatus 101B is set to the address of the setting value management service 310B in the private cloud environment 140. According to the example illustrated in FIG. 4A, the address of the setting value management service 310B is set to the value of the setting value identifier "device_settings.cloud_address".

In step S1101, the setting value management service address setting unit 307 of the image forming apparatus 101A multicasts a setting value management service address storage device search packet (also referred to as a search packet) on the network 106. This search packet is used for searching an image forming apparatus that stores address information of the setting value management service. More specifically, the setting value management service address setting unit 307 performs multicasting using the Service Location Protocol (SLP) defined by the Request for Comments (RFC) 2608.

FIGS. 12A and 12B illustrate examples of a search packet and a response packet. FIG. 12A illustrates an example of a search packet which is multicast in step S1101 in FIG. 11. This search packet is in SLP. As a character string 1201 indicates, the service type to be searched is "service:cloud-address.ddd". Further, as a character string 1202 indicates, SCOPE of the search packet is "ddd".

In step S1102, the setting value management service address setting unit 307 determines whether a response to the search packet is received. If a response is received (YES in step S1102), the processing proceeds to step S1103.

FIG. 12B illustrates an example of a response packet received by the setting value management service address setting unit 307. The response packet is also in the format of SLP. As "URL Entry" 1203 indicates, the response packet designates uniform resource locator (URL) Entry including information such as the URL of the setting value management service.

Referring back again to FIG. 11, in step S1103, the setting value management service address setting unit 307 issues a setting value management service address acquisition request to the image forming apparatus as the source of the response (response source). The setting value management service address acquisition request requests for transmission of a setting value management service address which manages the image forming apparatus as the response source. According to this example, the image forming apparatus as the response source is the image forming apparatus 101B.

In step S1104, the setting value management service address setting unit 307 receives the setting value management service address from the setting value management service address response unit 308 in the image forming apparatus 101B as the response source. The received setting value management service address is the address of the setting value management service 310B as the access destination of the image forming apparatus 101B.

In other words, the setting value management service address setting unit 307 functions as a search unit that searches an image forming apparatus that stores the address information of the setting value management service. Then, from the searched image forming apparatus, the setting value management service address setting unit 307 acquires the address information of the setting value management service that manages the image forming apparatus.

In step S1105, the setting value management service address setting unit 307 updates the real configuration data stored in the real configuration data storage unit 301 by using the address received from the image forming apparatus 101B. In this manner, after the setting value management service address is acquired and set, the real device configuration data notification unit 306 of the image forming apparatus 101 executes the processing below. In other words, the real device configuration data notification unit 306 transmits a configuration data generation request to the setting value management service that corresponds to the setting value management service address received by the setting value management service address setting unit 307 in step S1104 (step S1005 in FIG. 10).

In step S1102, if a response to the request is not received in a predetermined period (NO in step S1102), the processing proceeds to step S1106. In step S1106, the setting value management service address setting unit 307 displays a UI screen used for setting the setting value management service address on the display 205A of the image forming apparatus 101A.

In step S1107, the setting value management service address setting unit 307 determines whether the user has input an address via the UI screen. If an address is not yet input by the user (NO in step S1107), the processing in step S1107 is repeated. If an address is input by the user (YES in step S1107), the processing proceeds to step S1105. In step S1105, the setting value management service address setting unit 307 updates the real configuration data by using the input address.

On the other hand, in step S1150, the setting value management service address response unit 308 of the image forming apparatus 101B determines whether a setting value management service address storage device search packet has been received. If the setting value management service address response unit 308 determines that a setting value management service address storage device search packet has not been received yet (NO in step S1150), the processing in step S1150 is repeated. If the setting value management service address response unit 308 determines that a setting value management service address storage device search packet has been received (YES in step S1150), the processing proceeds to step S1151. According to this example, the setting value management service address response unit 308 receives the setting value management service address storage device search packet which the image forming apparatus 101A performed multicasting in step S1101.

In step S1151, the setting value management service address response unit 308 returns a response packet in SLP to the image forming apparatus 101A. In other words, the setting value management service address response unit 308 functions as a response unit that receives the search packet and transmits, as a response to the search packet, address information of the setting value management service that manages the image forming apparatus 101B to the sender of the search packet. In step S1152, the setting value management service address response unit 308 determines whether a setting value management service address acquisition request transmitted from the image forming apparatus 101A has been received.

If the setting value management service address response unit 308 determines that a setting value management service address acquisition request is not yet received from the image forming apparatus 101A (NO in step S1152), the processing in step S1152 is repeated. If the setting value management service address response unit 308 determines that a setting value management service address acquisition request is received from the image forming apparatus 101A (YES in step S1152), the processing proceeds to step S1153. In step S1153, the setting value management service address response unit 308 reads out the setting value management service address set in the real configuration data stored in the real configuration data storage unit 301, and responds to the image forming apparatus 101A.

According to the processing example described above with reference to FIG. 11, the image forming apparatus 101A sends again an inquiry about the setting value management service address to the image forming apparatus 101B which has responded to the search packet in step S1103. However, as a response to the search packet, the image forming apparatus 101A can directly receive the setting value management service address.

Further, in an environment where a plurality of image forming apparatuses are operating, responses from a plurality of image forming apparatuses can be returned in response to the search packet which has been distributed by multicast by the image forming apparatus 101A in step S1101. In this case, the setting value management service address setting unit 307 of the image forming apparatus 101A selects one response from the plurality of responses, and updates the real configuration data using the address information included in the selected response.

As a selection method of the response, for example, the image forming apparatus 101A can select the response which has been returned first or randomly select a response. The real device configuration data notification unit 306 transmits a configuration data generation request to the setting value management service that corresponds to the address information included in the updated real configuration data, in other words, the address information included in the selected response.

Further, when the image forming apparatus 101B returns the response, information of the time the image forming apparatus 101B last accessed the setting value management service can be included in the response. In other words, the response to the search packet can include access time information being the time information of the last access by the response source to the setting value management service. Then, based on the access time information included in each of the plurality of responses, the setting value management service address setting unit 307 of the image forming apparatus 101A can select one address. For example, the setting value management service address setting unit 307 can select the address information included in a response from the image forming apparatus that most recently accessed the setting value management service.

According to the processing described with reference to FIG. 11, the image forming apparatus 101A acquires the address of the setting value management service that manages the configuration data of the image forming apparatus 101A from the image forming apparatus 101B which is located around the image forming apparatus 101A.

According to the system configuration example in FIG. 1 described above, the service engineer uses the terminal apparatus 102B arranged in the service engineer environment 110.

However, the present invention can take different configurations. For example, the service engineer can use the terminal apparatus 102A provided in the user environment 100 after receiving permission to use the terminal apparatus 102A.

Further, regarding the hardware configuration example illustrated in FIG. 2, although the server computer group 105 includes the server computer 210A and the server computer 210B, the present invention can take other configurations. For example, the computer in the server computer group 105 can by only one server computer 210A. Further, the server computer group 105 may be included in the user environment 100, the service engineer environment 110, or the vendor environment 120 of the image forming apparatus or the like.

Additionally, regarding the hardware configuration example illustrated in FIG. 2, although the server computer 210A and the server computer 210B communicate with each other via the network 220, the present invention can take other configurations. For example, the server computer 210A and the server computer 210B can communicate with each other via the Internet 104.

Further, regarding the function block diagram in FIG. 3, although the real configuration data storage unit 301 stores the real configuration data in the auxiliary storage unit 204A, the present invention can take different configurations. For example, the real configuration data storage unit 301 can temporarily store the real configuration data in the volatile memory 203A. If the real configuration data is temporarily stored in the volatile memory 203A, the real configuration data will be lost when the power is turned off. Thus, in this case, each time the power of the device is turned on, the virtual configuration data reception unit 303 receives the virtual configuration data. In other words, step S1004 in FIG. 10 regarding the updating determination processing of the virtual configuration data will be skipped.

Further, regarding the function block diagram illustrated in FIG. 3, the real device configuration data collection unit 304 collects the real device configuration data each time the power of the image forming apparatus is turned on. However, the present invention is not limited to such configuration. For example, the image forming apparatus 101 can include a specified processing unit (e.g., a real device configuration data storage unit) that constantly stores the real device configuration data in the auxiliary storage unit 204A.

If the real device configuration data is constantly stored in the auxiliary storage unit 204A by the real device configuration data storage unit, according to the change of the real device configuration data, the real device configuration data stored in the real device configuration data storage unit needs to be promptly rewritten. Thus, the real device configuration data collection unit 304 monitors the real device configuration data. If a change in the content is detected, the real device configuration data stored in the real device configuration data storage unit is updated. Further, the real device configuration data notification unit 306 can acquire the real device configuration data by issuing a request to the real device configuration data storage unit.

Further, regarding the function block diagram illustrated in FIG. 3, the tenant identifier storage unit 305 stores the tenant identifier in the auxiliary storage unit 204A. However, the present invention can take other configurations. For example, the user can input the tenant identifier each time it is needed by using the input device 206A. The timing the tenant identifier is input can be the timing the image forming apparatus is started or at different timing. If the user inputs the tenant identifier each time by using the input device 206A, the tenant identifier will be stored in the volatile memory 203A.

Further, regarding the function block diagram illustrated in FIG. 3, the real device configuration data notification unit 306 detects that the power of the image forming apparatus is ON before it performs processing. However, the present invention is not limited to such configuration. For example, the user can instruct the acquisition of the virtual configuration data by using the input device 206A. If the user instructs the acquisition of the virtual configuration data by using the input device 206A, after detecting the instruction issued by the user in step S1001 in FIG. 10, the real device configuration data notification unit 306 can execute the processing on and after step S1002.

Further, regarding the function block diagram illustrated in FIG. 3, although the virtual configuration data generation unit 316 generates the virtual configuration data based on the model-based setting value schema, the tenant configuration data, and the virtual device configuration data, the present invention is not limited to such configuration. For example, based on the model-based setting value schema and the tenant configuration data, the virtual configuration data generation unit 316 can generate the virtual configuration data according to the model. If the virtual configuration data generation unit 316 generates the virtual configuration data according to the model, the image forming apparatus refers to the real configuration data that corresponds to the device configuration when the real configuration data is updated with the virtual configuration data.

Further, the virtual configuration data generation unit 316 can generate the virtual configuration data by using license data. If the virtual configuration data generation unit 316 generates the virtual configuration data by using license data, virtual configuration data that matches the optional function of the image forming apparatus is generated.

According to the function block diagram illustrated in FIG. 3, although the image forming apparatus 101 includes the setting value management service address response unit 308, the present invention can take a different configuration. For example, the setting value management service address response unit 308 can be included in the terminal apparatus 102. Then, the setting value management service address response unit 308 can respond to the inquiry from the setting value management service address setting unit 307 in the image forming apparatus 101. In this case, the processing in steps S1150 to S1153 in FIG. 11 will be executed by the terminal apparatus 102.

Further, although the virtual device configuration data 804 as a data item of the virtual device illustrated in FIG. 6 includes the identification information of the virtual device configuration data, the virtual device configuration data 804 can include an entity of the data. Further, although the identification information of the virtual configuration data includes the virtual configuration data 805 of as the data item of the virtual device, the virtual configuration data 805 can include the entity of the data.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-152180 filed Jul. 8, 2011, which is hereby incorporated by reference herein in its entirety.

What is claimed is:

1. An information processing system including a management apparatus configured to manage operation setting information used for changing an operation of an image forming apparatus and the image forming apparatus configured to be managed, in a predetermined management unit, by the management apparatus, the image forming apparatus comprising:

a configuration change determination unit configured to determine whether a change in configuration information of a device in the image forming apparatus is made;

a request unit configured to transmit, if a change in the configuration information is determined, an operation setting generation request including the changed configuration information and information about the management unit corresponding to the image forming apparatus, and requesting generation of operation setting information corresponding to the image forming apparatus, to the management apparatus via a network;

an acquisition unit configured to acquire the operation setting information corresponding to the image forming apparatus from the management apparatus, which is a destination of the operation setting generation request and which has generated the operation setting information according to a determination that the operation setting generation request has been successful;

an error notification reception unit configured to receive an error notification from the management apparatus, which is the destination of the operation setting generation request and which has determined that the operation setting generation request has failed; and a search unit configured to, if the error notification reception unit receives the error notification from the management apparatus, search an image forming apparatus that stores address information of the management apparatus, and to acquire the address information of the management apparatus that manages the image forming apparatus from the searched image forming apparatus, wherein, if the error notification reception unit receives the error notification from the management apparatus, the request unit transmits the operation setting generation request to the management apparatus that corresponds to the address information acquired by the search unit.

2. The information processing system according to claim 1, wherein the management apparatus further comprises:

a request accepting unit configured to accept the operation setting generation request from the image forming apparatus;

a determination unit configured to determine whether the operation setting generation request has been successful, based on information about the management unit included in the accepted operation setting generation request and information about the management unit previously stored in a storage unit;

an error notification unit configured to issue the error notification to the image forming apparatus if failure of the operation setting generation request is determined;

a generation unit configured to generate, if the operation setting generation request is determined successful, the operation setting information corresponding to the image forming apparatus based on the configuration information included in the operation setting generation request; and a transmission unit configured to transmit the generated operation setting information to the image forming apparatus.

3. The information processing system according to claim 1, wherein the search unit multicasts, on the network, a search packet used for searching the image forming apparatus storing the address information of the management apparatus.

4. The information processing system according to claim 3, wherein the image forming apparatus further comprises a response unit configured to, when the search packet is received, transmit address information of the management apparatus that manages the image forming apparatus to a sender of the search packet as a response to the search packet.

5. The information processing system according to claim 4, wherein, if a plurality of responses is received with respect to the search packet, the search unit selects one response from the plurality of responses, and wherein the request unit transmits the operation setting generation request to the management apparatus corresponding to the address information included in the response selected by the search unit.

6. The information processing system according to claim 5, wherein the response to the search packet includes access time information of a time a responder last accessed the management apparatus, and wherein the search unit further selects, if a plurality of responses is received with respect to the search packet, one piece of the address information based on the access time information included in each of the plurality of responses.

7. An image forming apparatus configured to allow operation setting information used for changing an operation thereof to be managed by a management apparatus in a predetermined management unit, the image forming apparatus comprising:

a configuration change determination unit configured to determine whether a change in configuration information of a device in the image forming apparatus is made;

a request unit configured to transmit, if a change in the configuration information is determined, an operation setting generation request including the changed configuration information and information about the management unit corresponding to the image forming apparatus and requesting generation of the operation setting information corresponding to the image forming apparatus, to the management apparatus via a network;

an acquisition unit configured to acquire the operation setting information corresponding to the image forming apparatus from the management apparatus, which is a destination of the operation setting generation request and which has generated the operation setting information according to a determination that the operation setting generation request has been successful;

an error notification reception unit configured to receive an error notification from the management apparatus, which is the destination of the operation setting generation request and which has determined that the operation setting generation request has failed; and a search unit configured to, if the error notification reception unit receives the error notification from the management apparatus, search an image forming apparatus that stores address information of the management apparatus, and to acquire the address information of the management apparatus that manages the image forming apparatus from the searched image forming apparatus, wherein, if the error notification reception unit receives the error notification from the management apparatus, the request unit transmits the operation setting generation request to the management apparatus that corresponds to the address information acquired by the search unit.

8. A management apparatus configured to manage operation setting information used for changing an operation of an image forming apparatus in a predetermined management unit, the management apparatus comprising:

a request accepting unit configured to accept, from the image forming apparatus, an operation setting generation request including configuration information which has been changed and information of the unit of management corresponding to the image forming apparatus out of configuration information of a device of the image forming apparatus, and which requests generation of operation setting information corresponding to the image forming apparatus via a network;

a determination unit configured to determine whether the operation setting generation request has been successful based on information about the management unit included in the accepted operation setting generation request and information about the management unit previously stored in a storage unit;

an error notification unit configured to issue an error notification to the image forming apparatus if failure of the operation setting generation request is determined;

a generation unit configured to generate, if the operation setting generation request is determined successful, the operation setting information corresponding to the image forming apparatus based on the configuration information included in the operation setting generation request; and a transmission unit configured to transmit the generated operation setting information to the image forming apparatus.

9. A method, in an information processing system including a management apparatus configured to manage operation setting information used for changing an operation of an image forming apparatus and the image forming apparatus configured to be managed, in a predetermined management unit, by the management apparatus, for managing the operation setting information, the method comprising:

determining, via the image forming apparatus, whether a change in configuration information of a device in the image forming apparatus is made;

if a change in the configuration information is determined, transmitting, via the image forming apparatus, an operation setting generation request including the changed configuration information and information about the management unit corresponding to the image forming apparatus, and requesting generation of the operation setting information corresponding to the image forming apparatus, to the management apparatus via a network;

acquiring, via the image forming apparatus, the operation setting information corresponding to the image forming apparatus from the management apparatus, which is a destination of the operation setting generation request and which has generated the operation setting information according to a determination that the operation setting generation request has been successful;

receiving, via the image forming apparatus, an error notification from the management apparatus, which is the destination of the operation setting generation request and which has determined that the operation setting generation request has failed;

if the error notification is received from the management apparatus, searching, via the image forming apparatus, an image forming apparatus that stores address information of the management apparatus, and acquiring the address information of the management apparatus that manages the image forming apparatus from the searched image forming apparatus; and if the error notification is received from the management apparatus, transmitting, via the image forming apparatus, the operation setting generation request to the management apparatus that corresponds to the address information acquired by the searching.

10. A non-transitory computer-readable storage medium storing a program that causes a computer to execute the method according to claim 9.

* * * * *